United States Patent
Sommerer et al.

(10) Patent No.: US 10,580,610 B2
(45) Date of Patent: Mar. 3, 2020

(54) COLD CATHODE SWITCHING DEVICE AND CONVERTER

(71) Applicant: GENERAL ELECTRIC COMPANY, Schenectady, NY (US)

(72) Inventors: Timothy John Sommerer, Charlton, NY (US); Joseph Darryl Michael, Schenectady, NY (US); David John Smith, Clifton Park, NY (US); Sergey Joseph Zalubovsky, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 181 days.

(21) Appl. No.: 14/776,758

(22) PCT Filed: May 21, 2013

(86) PCT No.: PCT/US2013/041987
§ 371 (c)(1),
(2) Date: Sep. 15, 2015

(87) PCT Pub. No.: WO2014/143100
PCT Pub. Date: Sep. 18, 2014

(65) Prior Publication Data
US 2016/0020057 A1 Jan. 21, 2016

Related U.S. Application Data

(60) Provisional application No. 61/790,650, filed on Mar. 15, 2013.

(51) Int. Cl.
*H01J 13/08* (2006.01)
*H01J 13/52* (2006.01)
(Continued)

(52) U.S. Cl.
CPC ............ *H01J 13/08* (2013.01); *H01J 13/52* (2013.01); *H01J 17/08* (2013.01); *H02M 7/006* (2013.01)

(58) Field of Classification Search
None
See application file for complete search history.

(56) References Cited

U.S. PATENT DOCUMENTS 2,182,736 A * 12/1939 Penning .................. H01J 17/14
313/157
2,654,856 A * 10/1953 Toulon .................... H01J 13/34
165/80.4
(Continued)

FOREIGN PATENT DOCUMENTS

CN 101504903 A 8/2009
CN 101924328 A 12/2010
(Continued)

OTHER PUBLICATIONS

Bi Meena et al "Pseudospark Switch Development for Pulse power" I J. of Physics Conference series 114, 2008, 012057.*
(Continued)

*Primary Examiner* — Alexander H Taningco
*Assistant Examiner* — Srinivas Sathiraju
(74) *Attorney, Agent, or Firm* — Eversheds Sutherland (US) LLP

(57) ABSTRACT

A cold-cathode switching device is presented. The cold-cathode switching device includes a housing defining a chamber; an ionizable gas disposed in the chamber; and a plurality of electrodes disposed in the chamber. The plurality of electrodes includes a cathode and an anode defining a discharge gap, and wherein at least one of the cathode and anode comprises a material that is liquid at an operating temperature of the cathode or the anode.

15 Claims, 3 Drawing Sheets

(51) Int. Cl.
*H02M 7/00* (2006.01)
*H01J 17/08* (2006.01)

(56) References Cited

U.S. PATENT DOCUMENTS

| | | | | |
|---|---|---|---|---|
| 2,729,762 A * | 1/1956 | Hagen | ............ | H03K 3/37 |
| | | | | 313/574 |
| 2,782,343 A * | 2/1957 | Geisler | ............ | H01J 17/44 |
| | | | | 313/589 |
| 3,024,382 A * | 3/1962 | Schaefer | ............ | H01J 13/34 |
| | | | | 313/146 |
| 3,263,121 A * | 7/1966 | White | ............ | H01J 13/00 |
| | | | | 313/163 |
| 3,290,553 A * | 12/1966 | Lafferty | ............ | H01J 13/08 |
| | | | | 313/150 |
| 3,366,835 A * | 1/1968 | Morris | ............ | H05B 41/30 |
| | | | | 250/214 R |
| 3,369,094 A * | 2/1968 | Langberg | ............ | H01H 1/08 |
| | | | | 200/199 |
| 3,475,636 A * | 10/1969 | Eckhardt | ............ | H01J 13/06 |
| | | | | 313/163 |
| 3,577,097 A * | 5/1971 | Hilberg | ............ | G02F 1/03 |
| | | | | 327/506 |
| 3,586,904 A * | 6/1971 | Eckhardt | ............ | H01J 13/06 |
| | | | | 313/163 |
| 3,662,205 A * | 5/1972 | Lian | ............ | H01J 13/04 |
| | | | | 313/163 |
| 3,673,504 A * | 6/1972 | Hilberg | ............ | G02F 1/03 |
| | | | | 315/229 |
| 3,699,384 A * | 10/1972 | Eckhardt | ............ | H01J 13/04 |
| | | | | 313/163 |
| 4,210,371 A * | 7/1980 | Gerkema | ............ | F16C 17/105 |
| | | | | 378/133 |
| 4,562,587 A * | 12/1985 | Gerkema | ............ | F16C 17/105 |
| | | | | 378/125 |
| 4,596,945 A * | 6/1986 | Schumacher | ............ | H01J 17/44 |
| | | | | 250/426 |
| 4,950,962 A * | 8/1990 | Birnbach | ............ | G21K 1/02 |
| | | | | 313/293 |
| 5,008,585 A * | 4/1991 | Bernardet | ............ | H01J 27/08 |
| | | | | 313/231.31 |
| 5,019,752 A * | 5/1991 | Schumacher | ............ | H01J 17/066 |
| | | | | 313/162 |
| 5,055,748 A * | 10/1991 | Reinhardt | ............ | H01J 17/30 |
| | | | | 313/590 |
| 5,057,740 A * | 10/1991 | Kirkman-Amemiya | ............ | |
| | | | | H01J 17/30 |
| | | | | 313/296 |
| 5,828,176 A * | 10/1998 | Goebel | ............ | H01J 17/14 |
| | | | | 315/111.41 |
| 6,011,106 A | 1/2000 | de la Cuesta Sheppard | | |
| 6,611,106 B2 * | 8/2003 | Monkhorst | ............ | G21B 1/00 |
| | | | | 250/251 |
| 7,518,300 B2 * | 4/2009 | Bosch | ............ | H05G 2/003 |
| | | | | 313/231.31 |
| 7,834,554 B2 * | 11/2010 | Horsky | ............ | C23C 14/48 |
| | | | | 315/111.81 |
| 7,872,422 B2 * | 1/2011 | Murphy | ............ | H01J 27/024 |
| | | | | 250/423 R |
| 8,101,061 B2 * | 1/2012 | Suh | ............ | B82Y 30/00 |
| | | | | 205/414 |
| 9,013,853 B2 * | 4/2015 | Sheng | ............ | H01J 17/12 |
| | | | | 361/115 |
| 2007/0001571 A1 * | 1/2007 | Bosch | ............ | H05G 2/003 |
| | | | | 313/231.31 |

FOREIGN PATENT DOCUMENTS

| | | |
|---|---|---|
| CN | 102223102 A | 10/2011 |
| GB | 835400 A | 5/1960 |
| GB | 838799 A | 6/1960 |
| GB | 920182 A | 3/1963 |
| GB | 1188423 A | 4/1970 |
| WO | 9004260 A1 | 4/1990 |

OTHER PUBLICATIONS

Nikiforov, "Plasma Sputtering of Water Molecules from the Liquid Phase by Low-Energy Ions: Molecular Dynamics Simulation", High Energy Chemistry, vol. 42, Issue 3, pp. 235, May 2008.

Kaneko et al., "Static Gas-Liquid Interfacial Direct Current Discharge Plasmas using Ionic Liquid Cathode", Journal of Applied Physics, vol. 105, Issue 10, 2009.

International Search Report and Written Opinion dated Nov. 5, 2013 which was issued in connection with PCT Patent Application No. PCT/US13/41987 which was filed on May 21, 2013.

Brophy, "Secondary Emission of Electrons from Liquid Metal Surfaces", Physical Review Letters, vol. No. 83, Issue No. 3, pp. 534-536, Aug. 1, 1951.

Sommerer et al., "Cathode Heating Mechanisms in Pseudospark Plasma Switches", Journal of Applied Physics, vol. No. 72, Issue No. 8, pp. 3374-3383, Oct. 15, 1992.

Goebel, "Cold-Cathode, Pulsed-Power Plasma Discharge Switch", Review of Scientific Instruments, vol. No. 67, Issue No. 9, pp. 3136-3148, Sep. 1996.

David et al., "Liquid Metal Anode X-Ray Tube", Laser-Generated and Other Laboratory X-Ray and EUV Sources, Optics, and Applications, Proceedings of SPIE, vol. No. 5196, pp. 432-443, Jan. 7, 2004.

Unofficial English Translation of Chinese office action issued in connection with corresponding CN Application No. 201380074761.5 dated Aug. 1, 2016.

Unofficial translation and a Office Action issued in connection with related CN Application No. 201380074761.5 dated Jul. 12, 2017.

Office Action issued in connection with corresponding CA Application No. 2903990 dated Aug. 16, 2018.

* cited by examiner

COLD CATHODE SWITCHING DEVICE AND CONVERTER

CROSS REFERENCE TO RELATED APPLICATIONS

This application is a National Phase of International Application No. PCT/US13/41987, filed May 21, 2013, which claims priority to US Provisional Patent Application No. 60/790,650, entitled "RELIABLE HIGH-POWER GAS SWITCH WITH LIQUID CATHODE", filed on Mar. 15, 2013, which is hereby incorporated by reference in its entirety.

STATEMENT REGARDING FEDERALLY SPONSORED RESEARCH OR DEVELOPMENT

This invention was made with Government support under contract number DE-AR0000298 awarded by the United States Department of Energy. The Government has certain rights in the invention.

BACKGROUND OF THE INVENTION

Embodiments of the present invention relate generally to cold-cathode switching devices. Particularly, an embodiment of the present invention relates to cold-cathode switching devices suitable for use in high-voltage power conversion applications.

Semiconductor switches are widely used in high-voltage power conversion systems because of their reliability and long life. However, the open-circuit standoff voltage of each semiconductor switch is relatively low (for example, about 10 kV), such that many semiconductor switches have to be stacked together in series to handle the high voltages (300-1000 kV). Further, the cost and complexity of the high-voltage power conversion systems employing semiconductors switches may be undesirably high.

Gas switches can stand off higher voltages for example, greater than 100 kV. However, gas switches are not widely used, because their reliability and life are not sufficient for use in electric grid applications. Low reliability and short life arise in part from damage to the cathode surface caused by ion bombardment, sputtering, heating, and evaporation during switch operation.

Accordingly, there is a need for improved gas switch configurations. Further, it may be desirable to have reliable gas switch configurations that may be used in high-voltage power conversion applications.

BRIEF DESCRIPTION OF THE INVENTION

One embodiment is directed to a cold-cathode switching device. The cold-cathode switching device comprises a housing defining a chamber; an ionizable gas disposed in the chamber; and a plurality of electrodes disposed in the chamber. The plurality of electrodes include a cathode and an anode defining a discharge gap, and wherein at least one of the cathode and anode comprises a material that is liquid at an operating temperature of the cathode or the anode.

Another embodiment is directed to a cold-cathode switching device. The cold-cathode switching device comprises a housing defining a chamber; an ionizable gas disposed in the chamber; and at least four electrodes disposed in the chamber. The electrodes include a cathode and an anode defining a discharge gap, and wherein at least one of the cathode and anode comprises a material that is liquid at an operating temperature of the cathode or the anode.

Another embodiment is directed to a power converter. The power converter comprises an input section; an output section; and at least one cold-cathode switching device electrically coupled between the input section and the output section. The cold-cathode switching device is configured to convert an alternating current (AC) to direct current (DC), or direct current (DC) to alternating current (AC). The cold-cathode switching device comprises a housing defining a chamber; an ionizable gas disposed in the chamber; and a plurality of electrodes disposed in the chamber. The plurality of electrodes include a cathode and an anode defining a discharge gap, and wherein at least one of the cathode and anode comprises a material that is liquid at an operating temperature of the cathode or the anode.

BRIEF DESCRIPTION OF THE DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

Figure 1:
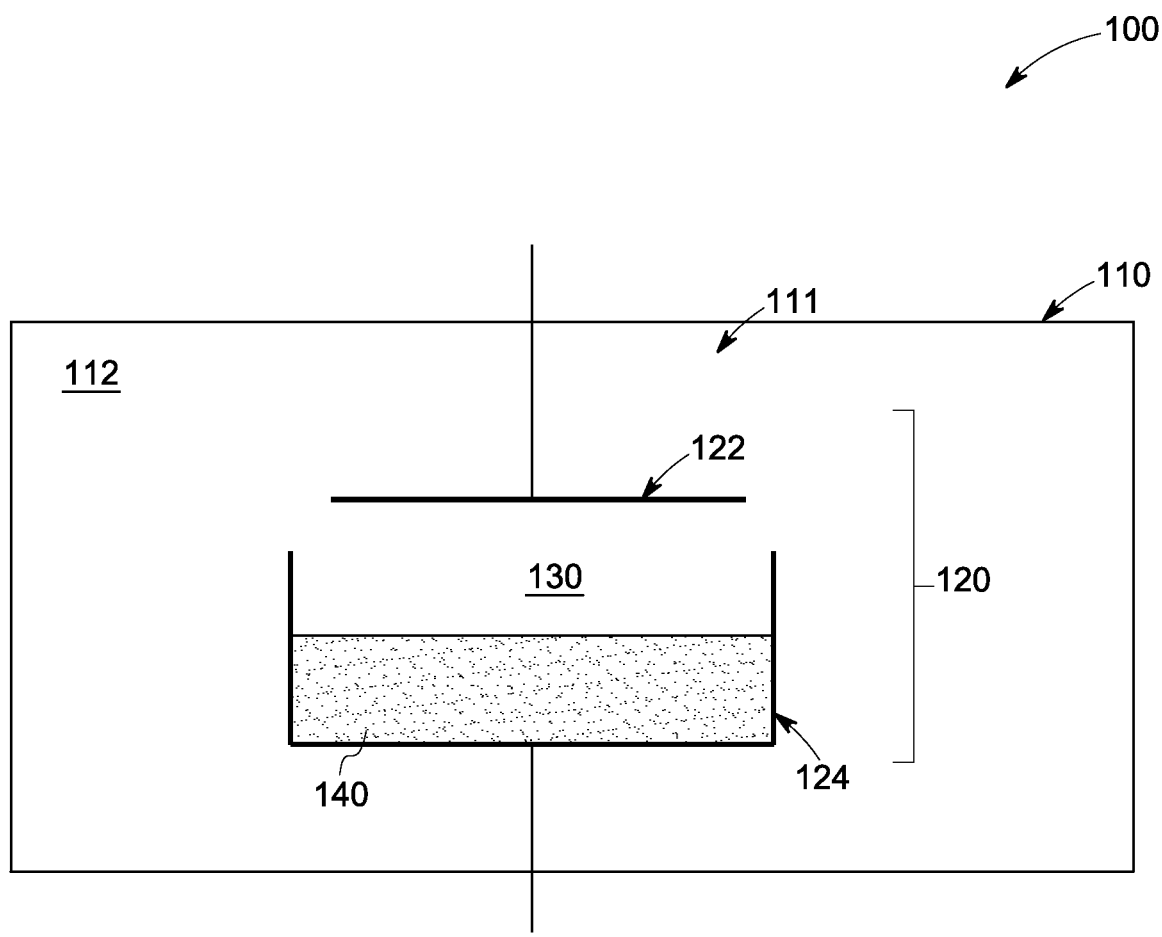
FIG. 1 illustrates a cold-cathode switching device in accordance with some embodiments of the invention.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill, having the benefit of this disclosure.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

As discussed in detail below, some embodiments of the invention are directed to a cold-cathode switching device. The term "switching device" as used herein refers to a device in which a current flows from one electrode to the other via a discharge gap when the switching device is closed, and no current flows when the switching device is open. The term "cold-cathode switching device" as used herein refers to a switching device including a cathode that operates in a cold-cathode operation mode. In a cold-cathode operation mode, electrons are emitted from the cathode surface in response to the impinging ions ("secondary electron emission") at the cathode surface.

Secondary electron emission is distinct from other electron emission and plasma maintenance mechanisms such as thermionic emission (where the cathode is hot enough that electrons evaporate, and no ion impingement is required); field emission (where very strong electric fields, on the order of $10^7$ V/cm at the cathode surface, are able to pull electrons over the confining electrostatic potential of the surface); thermal-field emission (a synergistic combination of the previous two processes); or photoemission (where an impinging photon ejects an electron from the surface). As is generally known, in a real cathode, all processes may occur simultaneously, but one process accounts for orders of magnitude more current than the others, and the name of that process is then used to describe the cathode operation and some characteristics of the overall plasma and device.

A "cold-cathode" switching device further includes a cathode material, from which the emission of electrons in response to the impact of ions from the plasma is only weakly dependent on the temperature of the material, and does not change noticeably, even when the temperature is changed so that the material melts or freezes. Thus, it will be apparent to one of ordinary skill in the art, in a cold-cathode switching device, the cathode surface temperature during operation is significantly lower than the temperature where significant thermionic electron emission occurs. The terms "cold-cathode switching device", "switching device", and "switch" are used herein interchangeably for the sake of brevity.

FIG. 1 schematically represents a cold-cathode switching device 100 as per one embodiment of the invention. As illustrated in FIG. 1, the cold-cathode switching device 100 includes a housing 110 defining a chamber 111. An ionizable gas 112 is disposed in the chamber 111. The switching device 100 further includes a plurality of electrodes 120 disposed in the chamber 111 (two such electrodes are illustrated in FIG. 1, for simplicity). Further, as illustrated in FIG. 1, the plurality of electrodes 120 includes an anode 122 and a cathode 124 defining a discharge gap 130. At least one of the cathode 124 and the anode 122 includes a material 140 that is liquid at an operating temperature of the cathode 124 or the anode 122. For illustration purposes, in FIG. 1, the cathode 124 is represented such that it includes the material 140.

The term "operating temperature of the cathode or the anode" as used herein refers to the temperature of the cathode 124 or the anode 122 during operation of the switching device 100 in the closed state. As noted earlier, current flows from the cathode 124 to the anode 122 via the discharge gap 130 when the switching device 100 is closed. In some embodiments, the operating temperature is in a range greater than 600 degrees Celsius. In some embodiments, the operating temperature is in a range from about −30 degrees Celsius to about 600 degrees Celsius. In some embodiments, the operating temperature is in range from about 0 degrees Celsius to about 450 degrees Celsius. In some embodiments, the operating temperature is in a range from about 20 degrees Celsius to about 300 degrees Celsius.

As noted, at least one of the cathode 124 or the anode 122 includes a material that is liquid at the operating temperature of the cathode or the anode. It should be noted that the material 140 may be in a solid-state at the time of assembling the switching device 100, and may transform to a liquid-state at the operating temperature of the cathode 124 or the anode 122, during the operation of the switching device 100. Alternately, the material 140 may already be in a liquid-state at the time of assembling the switching device 100.

A suitable material may further include one or more of the following characteristics: electrically conducting, capable of emitting electrons by secondary electron emission mechanism, low volatility (that is, low partial pressure at a given temperature), resistance to sputtering, substantially non-reactive with the ionizable gas in the chamber (for example, hydrogen), capable of being handled in a gas switch environment, and capable of being contained by gravity or surface tension.

The material 140 is substantially non-volatile at an operating temperature of the cathode 124 or the anode 122. The term "non-volatile" as used herein means that the partial pressure of any vaporized material is sufficiently small such that it does not affect the voltage standoff capability of the ionizable gas when the switch is open, or the conductivity of the ionized gas when the switch is closed. In some embodiments, the material has a partial pressure that is less than about $10^{-5}$ Torr at the operating temperature of the cathode or the anode. In some embodiments, the material has a partial pressure that is less than about $10^{-4}$ Torr at the operating temperature of the cathode or the anode. The material 140 is therefore distinct from volatile liquids, such as, for example, sodium or mercury, which are sometimes used in gas switches.

Suitable non limiting examples of the material include a metal, an ionic liquid, or combinations thereof. The term "metal" as used herein refers to elemental metal, a metal alloy, or combinations thereof. Suitable non-limiting examples of the metal include gallium, indium, bismuth, tin, lithium, lead, or combinations thereof. In certain embodiments, the material includes elemental gallium, a gallium alloy, or combinations thereof. Some specific examples of suitable metals and metal alloys are described in U.S. Pat. No. 3,290,553, incorporated herein by reference, so long as not directly contradictory to the teachings described herein.

Alloys of one or more of the aforementioned metals usually have lower melting points than the constituent elements, as well as a lower vapor pressure at the melting point. Some specific metal compositions have the desirable property of forming eutectic systems, and are known by names such as Field's metal (32.5 weight percent bismuth, 51 weight percent indium, and 16.5 weight percent tin, melting point 62° C.), Rose's metal (50 weight percent bismuth, 28 weight percent lead, and 22 weight percent tin, melting point 94° C.), and Wood's metal (50 weight percent bismuth, 26.7 weight percent lead, 13.3 weight percent tin, and 10 weight percent cadmium, melting point 70° C.).

Some specific examples of suitable binary eutectics of gallium are described in U.S. Pat. Nos. 4,210,371 and 4,562,587, incorporated herein by reference, so long as not directly contradictory to the teachings described herein. Several additional alloys are described by David et. al. in SPIE Proceedings 5196, 432 (2004) in the context of a liquid metal target material for an x-ray tube, incorporated herein by reference, so long as not directly contradictory to the teachings described herein.

In some embodiments, the cathode 124 includes a material 140 that is liquid at an operating temperature of the cathode 124, as noted previously. In certain embodiments, an active surface of the cathode is liquid. The term "active surface of the cathode" as used herein refers to an electron-emitting portion of the cathode, and is distinguished from regions of the cathode 124 that have other functions like mechanical support. In some cases, the cathode metal can be solid during assembly of device 100, and then rendered liquid at operating temperatures. In other cases, the metal can be liquid during assembly. As alluded to previously, gallium or an alloy thereof is sometimes used.

Without being bound by any theory, it is believed a cathode including a liquid material allows for the cathode surface to re-form (self-anneal) during operation of the switching device, and precludes formation of electrode surface irregularities that degrade switch performance, or shorten switch life. Further, the liquid cathode material is selected such that it does not substantially affect the basic operation of the switching device, such that, it does not easily vaporize, does not alter the gas plasma (e.g., hydrogen plasma) that is present during the conduction phase of a conventional gas switch, and does not transport and deposit on other interior parts of the switching device.

The cold-cathode switching device 100 further includes an ionizable gas 112. In some embodiments, the area between the cathode 124 and the anode 122 is occupied by the ionizable gas, during substantially all phases of operation (closed, open, or commutating). This is in contrast to switches that include volatile electrode materials, such as mercury or sodium. In such switches, the space between the cathode 124 and the anode 122 is occupied by the vaporized electrode material.

Suitable non-limiting examples of the ionizable gas 112 include hydrogen, helium, deuterium, or combinations thereof. The ionizable gas 112 may have a pressure in a range from about 10 milli Torr to about 10 Torr. In some embodiments, the ionizable gas 112 may have a pressure in a range from about 0.1 Torr to about 5 Torr.

In an exemplary embodiment, the ionizable gas 112 is hydrogen at a pressure in a range from about 0.1 Torr to about 1 Torr, at ambient temperature. During operation, electrical current is conducted from the cathode 124 to the anode 122 through the hydrogen gas within the discharge gap 130.

When the switching device 100 is open (that is, not conducting), the hydrogen gas insulates the anode 104 from the cathode 106. When the switching device 100 is closed (that is conducting), the hydrogen gas becomes ionized (that is, some portion of the hydrogen molecules are dissociated into free electrons, hydrogen molecular ions, hydrogen atoms, hydrogen atomic ions, etc.), resulting in an electrically conductive plasma. Electrical continuity is maintained between the cathode 124 and the hydrogen gas through secondary electron emission, by ion impact. Energetic (for example, 100-200 electron volts (eV)) ions from the plasma are drawn to the surface of cathode 124 by a relatively strong electric field. The impact of the ions on cathode 124 releases secondary electrons from the surface of cathode 124 into the gas phase. The released secondary electrons aid in sustaining the plasma. In an exemplary embodiment, the material of the cathode 124 does not evaporate to an extent that it substantially changes the properties of the hydrogen gas, either in its insulating state, or in its conducting state.

The high voltage standoff capability of the device, when it is open, may be determined by the ionizable gas properties and the geometry of the volume that separates the voltages on the electrodes (that is, the 'active' portions of the electrodes). The exemplary switching device 100, as illustrated in FIG. 1, is a plane-parallel switch. In such configurations, the cathode 124 is a planar cathode and the anode 122 is a planar anode. Alternatively, the switching device 100, the cathode 124, and the anode 122 may have any suitable configuration for operation as described herein.

The plurality of electrodes may further include one or more additional electrodes. In some embodiments, the switching device includes at least four electrodes. In some embodiments, the switching device 100 may further include a switching electrode 126 configured to open the switching device 100. The potential of the switching electrode 126 may be changed to interrupt the flow of current between the cathode 124 and the anode 122, thereby opening the switching device 100.

Figure 2:
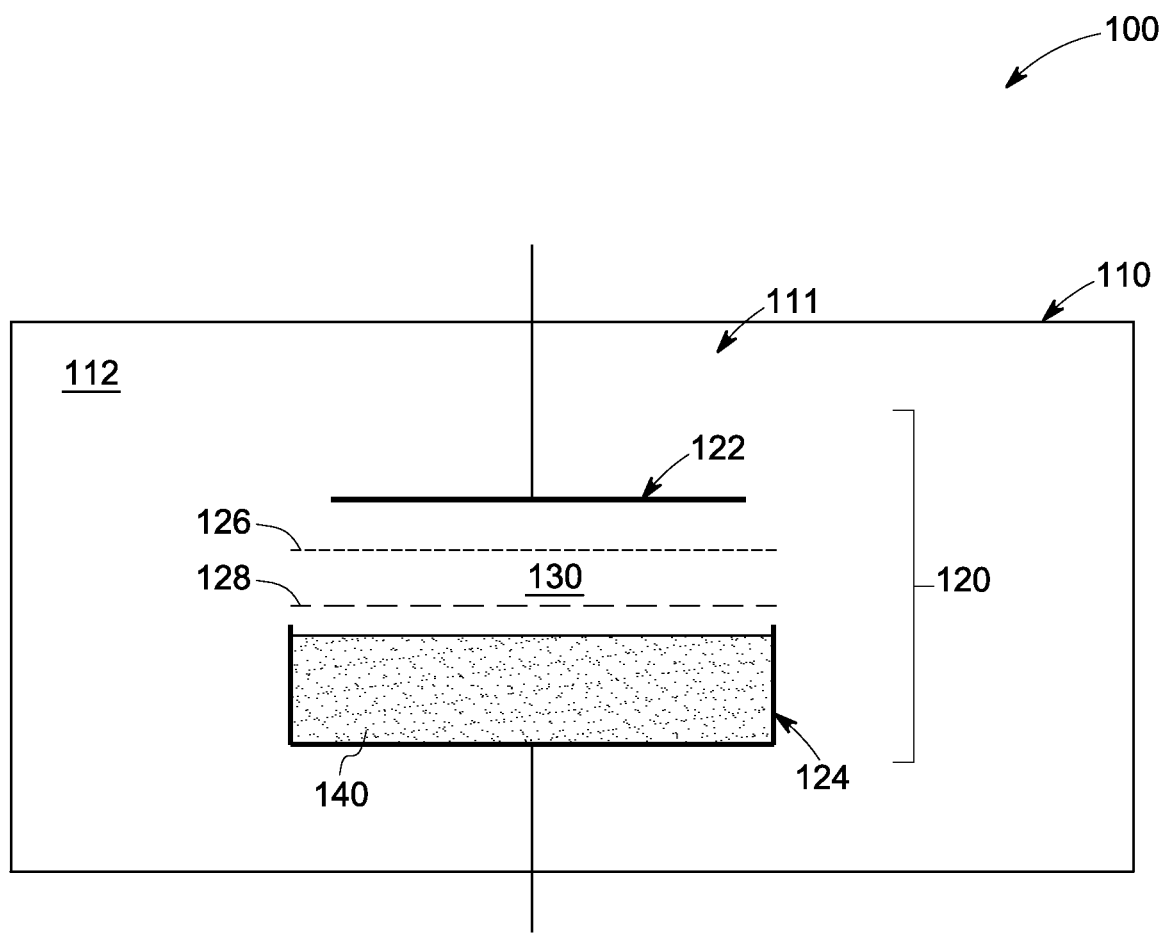
FIG. 2 illustrates a cold-cathode switching device in accordance with some embodiments of the invention.

In some embodiments, the switching device 100 may further include an additional electrode 128 (as indicated in FIG. 2), configured to provide initial ionization to close the switching device 100. Suitable non-limiting examples of electrode 128 include cosmic rays, ignitors, triggers, keep-alive plasmas, or combinations thereof. In particular embodiments, the electrode 128 includes a keep-alive grid (sometimes referred to in the art as a "simmer"). The keep-alive grid 128 may include a mesh or a screen of a conducting material that allows electrons and the gas ions to pass through. The keep-alive grid 128 is configured to maintain a weak ionized gas between the grid 128 and the cathode 124 to facilitate closing the switching device 100 without, for example, use of an ignitor.

The high-voltage standoff of the switching device 100 with a 'switching' grid, as described herein, may be determined by the geometry of the anode 122, the switching electrode 126, and the intervening volume of the ionizable gas 112. The volume between the switching electrode 126 and the cathode 124 may not affect the high-voltage-standoff properties of the switching device 100 when it is open, and may be adjusted and optimized to improve the current-carrying properties of the switching device 100 when it is closed. The presence of an intervening keep-alive grid 128 should also not affect the high-voltage standoff properties of the switching device 100.

In some embodiments, the switching device 100 may further include one or more additional components configured to increase the current density of the switching device 100. The current density at the cathode surface may be increased by one or more suitable methods, such as for example, use of hollow cathodes or use of magnets. In some instances, the switching device 100 may further include one or more magnets (not shown) configured to generate a magnetic field to alter a current carrying capacity of the switching device 100.

The switching device may further include one or more additional components (not shown), such as, wicks, heat pipes, heaters, coolers, and the like. For example, if small amounts of the liquid cathode material move about undesirably during operation of the switch, then various means (for example, wicks/heat pipes) may be employed to remove the liquid from the undesirable location, and even return it to the electrode. Further, in some instances, a small amount of gallium vapor may deposit on other surfaces on the interior of the switch, and possibly short-out the insulator. In such instances, the tube wall, or perhaps just the insulator itself, may be externally heated; or the cathode could be cooled, so that there is a driving force to return gallium metal to the cathode itself. Further, as noted earlier, in some embodiments, the melting point of the cathode material may be above room temperature. In such instances, it may be desirable to provide a heating mechanism to liquefy the cathode material, prior to full operation of the gas switch.

In some embodiments, the switching device 100 may include any suitable configuration, such as, for example, a planar configuration, a crossed-field switch configuration, or combinations thereof. Various types of crossed-field switches are described in the literature, for example, in U.S. Pat. No. 5,828,176, which is incorporated herein by reference (so long as the patent is not directly contradictory to the teachings described herein); and in a reference entitled "Cold-Cathode, Pulsed-Power Plasma Discharge Switch", D. Goebel, Rev. Sci. Instrum. 67(9) September 1996 (p. 3136 et seq). Planar configurations are also generally known in the art, and are considered to be planar variants of the crossed-field switches described in the above references.

Figure 3:
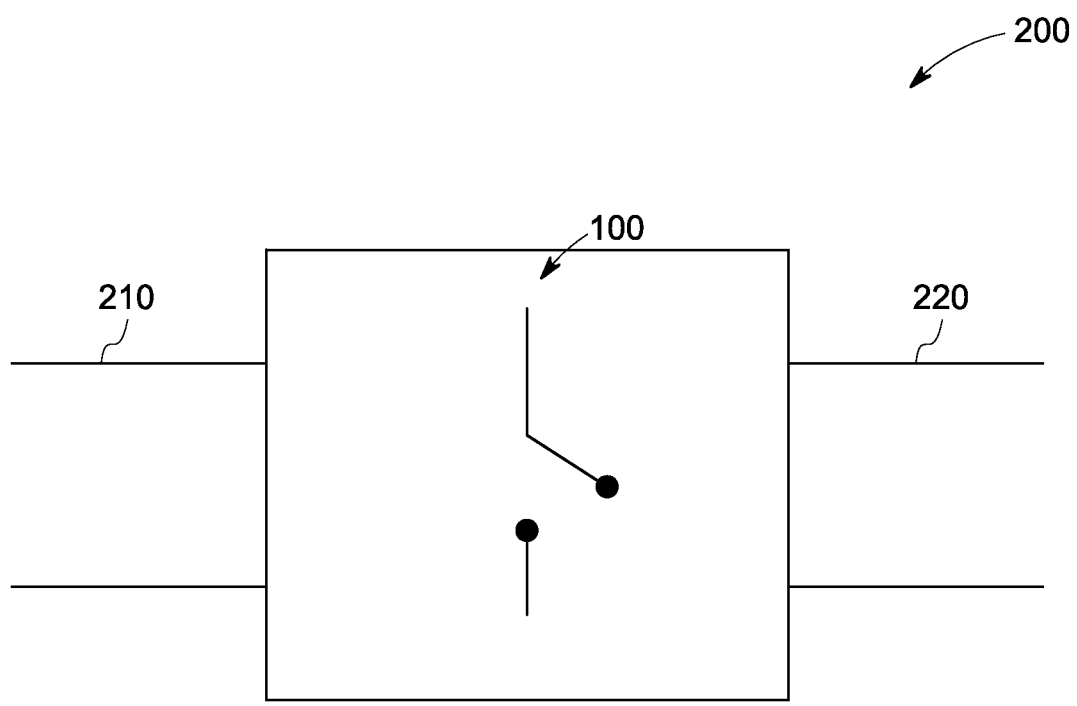
FIG. 3 illustrates a power converter in accordance with some embodiments of the invention.

A power converter in accordance with some embodiments of the invention is presented. FIG. 3 schematically represents a power converter 200 as per one embodiment of the invention. As illustrated in FIG. 3, the power converter 200 includes an input section 210 and an output section 220. The power converter 200 further includes at least one cold-cathode switching device 100 electrically coupled between the input section 210 and the output section 220. The cold-cathode switching device 100 is configured to convert an alternating current (AC) to direct current (DC), or direct current (DC) to alternating current (AC).

As noted earlier, and referring again to FIG. 1, the cold-cathode switching device 100 that forms part of the power converter includes a housing 110 defining a chamber 111. An ionizable gas 112 is disposed in the chamber 111. The switching device 100 further includes a plurality of electrodes 120 disposed in the chamber 111. Further, as illustrated in FIG. 1, the plurality of electrodes 120 includes an anode 122 and a cathode 124 defining a discharge gap 130. At least one of the cathode 124 and the anode 122 includes a material 140 that is liquid at an operating temperature of the cathode 124 or the anode 122.

The power converter 200 in accordance with some embodiments of the invention may be useful in power transmission systems. In certain embodiments, the power converter 200 may find applications in high-voltage direct-current (HVDC) transmission systems.

For high-voltage switching applications, such as, HVDC terminals, and in comparison with semiconductor switches, a cold-cathode switching device, in accordance with some embodiments of the invention, may be more particular. A single switch may stand off much higher voltage, on the order of about 100 kV, versus about 10 kV for a semiconductor switch. Fewer switches may therefore be required to stand off a given voltage (e.g., 1000 kV). In comparison with existing gas switches having conventional metal cathodes, e.g., hydrogen crossed-field switches and planar variants, the current density and duty cycle may be higher, while maintaining or improving device reliability and operating life. Compared with devices containing mercury (e.g., ignitrons), there is also a desirable separation of the functionality of the liquid metal cathode (for cathode life) and the hydrogen (as the ionizable gas composition). These two functions may be separately adjusted for optimal device performance, e.g., in terms of high-voltage standoff, and current-carrying capability.

The present invention has been described in terms of some specific embodiments. They are intended for illustration only, and should not be construed as being limiting in any way. Thus, it should be understood that modifications can be made thereto, which are within the scope of the invention and the appended claims. Furthermore, all of the patents, patent applications, articles, and texts which are mentioned above are incorporated herein by reference.

What is claimed is:

1. A cold-cathode switching device, comprising:
a housing defining a chamber;
an ionizable gas disposed in the chamber during all phases of operation of the cold-cathode switching device, the ionizable gas comprising helium, deuterium, or a combination thereof, the ionizable gas having a pressure in a range from about 10 milliTorr to about 10 Torr; and
a plurality of electrodes disposed in the chamber, wherein the plurality of electrodes comprise a cathode and an anode defining a discharge gap,
wherein the cathode comprises a material that is initially solid, but transitions to a liquid at an operating temperature of the cathode, and is also substantially non-volatile at the operating temperature of the cathode.

2. The cold-cathode switching device of claim 1, wherein the plurality of electrodes further comprises a switching electrode.

3. The cold-cathode switching device of claim 1, wherein the plurality of electrodes further comprises an electrode configured to provide initial ionization to close the cold-cathode switching device.

4. The cold-cathode switching device of claim 1, wherein the cathode comprises a planar cathode and the anode comprises a planar anode.

5. The cold-cathode switching device of claim 1, wherein the material comprises a metal, an ionic liquid, or combinations thereof.

6. The cold-cathode switching device of claim 1, wherein the material comprises a metal comprising gallium, indium, bismuth, tin, lithium, or combinations thereof.

7. The cold-cathode switching device of claim 1, wherein the material comprises elemental gallium, a gallium alloy, or combinations thereof.

8. The cold-cathode switching device of claim 1, wherein the operating temperature is in a range from about −30 degrees Celsius to about 600 degrees Celsius.

9. The cold-cathode switching device of claim 1, wherein the material has a partial pressure that is less than about $10^{-5}$ Torr at the operating temperature.

10. A power converter, comprising: an
input section;
an output section; and
at least one cold-cathode switching device electrically coupled between the input section and the output section, wherein the cold-cathode switching device is configured to convert an alternating current to direct current, or direct current to alternating current, and wherein the cold-cathode switching device comprises:
a housing defining a chamber;
an ionizable gas disposed in the chamber during all phases of operation of the cold-cathode switching device, the ionizable gas comprising helium, deuterium, or a combination thereof, the ionizable gas having a pressure in a range from about 10 milliTorr to about 10 Torr; and a plurality of electrodes disposed in the chamber, wherein the plurality of electrodes comprise a cathode and an anode defining a discharge gap, wherein the cathode comprises a material that is initially solid, but transitions to a liquid at an operating temperature of the cathode, and is also substantially non-volatile at the operating temperature of the cathode.

11. The power converter of claim 10, wherein the plurality of electrodes further comprises a switching electrode.

12. The power converter of claim 10, wherein the plurality of electrodes further comprises an electrode configured to provide initial ionization to close the switching device.

13. The power converter of claim 10, wherein the cathode comprises a planar cathode and the anode comprises a planar anode.

14. The power converter of claim 10, wherein the material comprises a metal, an ionic liquid, or combinations thereof.

15. The power converter of claim 10, wherein the material comprises a metal comprising gallium, indium, bismuth, tin, lithium, or combinations thereof.

\* \* \* \* \*